US006444783B1

(12) United States Patent
Dodd et al.

(10) Patent No.: US 6,444,783 B1
(45) Date of Patent: Sep. 3, 2002

(54) MELT-PROCESSIBLE SEMICRYSTALLINE BLOCK COPOLYIMIDES

(75) Inventors: John R. Dodd, Wilmington, DE (US); John A. Kreuz, Columbus; Brian C. Auman, Pickerington, both of OH (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/741,941

(22) Filed: Dec. 21, 2000

(51) Int. Cl.$^7$ .......................... C08L 79/08; C08G 69/26

(52) U.S. Cl. ........................ 528/353; 525/432; 525/436

(58) Field of Search ........................ 528/353; 525/432, 525/436

(56) References Cited

U.S. PATENT DOCUMENTS

| | | |
|---|---|---|
| 3,489,725 A | 1/1970 | Lucas |
| 3,803,085 A | 4/1974 | Takehoshi et al. |
| 4,073,773 A | 2/1978 | Banucci et al. |
| 4,281,100 A | 7/1981 | Takekoshi |
| 4,485,140 A | 11/1984 | Gannett et al. |
| 4,552,931 A | 11/1985 | St. Clair et al. |
| 4,837,300 A | 6/1989 | St. Clair et al. |
| 4,839,232 A | 6/1989 | Morita et al. |
| 4,876,330 A | 10/1989 | Higashi et al. |
| 4,883,718 A | 11/1989 | Ohta et al. |
| 4,904,758 A | 2/1990 | Kunimune et al. |
| 4,923,968 A | 5/1990 | Kunimune et al. |
| 5,077,382 A | 12/1991 | Meterko et al. |
| 5,106,938 A | 4/1992 | Bookbinder et al. |
| 5,116,939 A | 5/1992 | Fletcher et al. |
| 5,145,937 A | 9/1992 | Hergenrother et al. |
| 5,166,308 A | 11/1992 | Kreuz et al. |
| 5,171,828 A | 12/1992 | Meterko et al. |
| 5,202,412 A | 4/1993 | Auman et al. |
| 5,219,977 A | 6/1993 | Kreuz |
| 5,260,388 A | 11/1993 | Tamai et al. |
| 5,268,446 A | 12/1993 | Tamai et al. |
| 5,268,447 A | 12/1993 | Tamai et al. |
| 5,298,331 A | 3/1994 | Kanakarajan et al. |
| 5,302,652 A | 4/1994 | Parish |
| 5,406,124 A | 4/1995 | Morita et al. |
| 5,411,765 A | 5/1995 | Kanakarajan et al. |
| 5,464,928 A | 11/1995 | Chang et al. |
| 5,478,913 A | 12/1995 | Boyce et al. |
| 5,478,916 A | 12/1995 | Chang et al. |
| 5,484,879 A | 1/1996 | Buchanan et al. |
| 5,502,157 A | 3/1996 | Chang et al. |

FOREIGN PATENT DOCUMENTS

| | | |
|---|---|---|
| EP | 0 154 720 A1 | 9/1985 |
| EP | 0 367 482 A | 9/1990 |
| EP | 0 459 801 A2 | 12/1991 |

OTHER PUBLICATIONS

V. Ratta et al., "A Melt–Processable Semicrystalline Polymide Structural Adhesive Based on 1,3–Bis(4–aminophenoxy) benzene and 3,3',4,4'–Biphenyltetracarboxylic Dianhydride," Polymer 40 (1999), pp. 1889–1902 (Publication of Virginia Polytechnic Institute and State University, Blacksburg, VA).
J. Jensen et al., "Adhesive and Composite Properties of LARC –8515 Polyimide," High Performance Polym. 7 (1995), pp.. 11–21 (Publication of NASA Langley Research Center, Hampton, VA).
D. Heberer et al., "Crystallization and Morphology of Semi–crystalline Polyimides," Macromolecules 24 (1991), pp. 1890–1898 (Publication of University of Akron, Institute and Department of Polymer Science).
B. C. Auman and C. A. Renner, "Polymides Based on 2,2–Binaphthyl–and Biphenyl Ether Diamines," Polymer Preprints 35(2) (1994), pp. 747–748 (Publication of DuPont iTechnologies and SPEC CHEM).
M. J. Graham et al., "Effect of End Groups on the Thermal Stability of a Semicrystalline Polymide," Polymer Preprints 38(1) (1997), pp. 306–307 (Publication of Virginia Polytechnic Institute and State University, Blacksburg, VA).
M. J. Graham et al., "Semicrystalline Polymides Based on Ether Diamines," Polymer Preprints 37(1) (1996), pp. 487–488 (Publication of Virginia Polytechnic Institute and State University, Blacksburg, VA).
B. C. Auman and S. Trofimenko, "Soluble, Semi–rigid and Quasi Rod–like Polyimides Based on a Novel Fluorinted Dianhydride," (Publication of DuPont iTechnologies).
R. G. Bryant, "A Soluble Copolyimide," Polymer Preprints 35(1) (1994), pp. 517–518 (Publication of NASA Langley Research Center, Hampton, VA).
B. J. Jenson et al., "Development of a Unique Copolyimide Backbone for Imide Oligomers with Terminal Reactive Groups," Polymer Reprints 35(1) (1994), pp. 539–540 (Joint publication of NASA Langley Research Center, Hampton, VA and College of William and Mary, Williamsbuirg, VA).
Derwent Patent Abstracts, AN1989–042652 & JP63314242, Kanegafuchi Chem KK, Sep. 23, 1993.

(List continued on next page.)

*Primary Examiner*—Ana Woodward

(57) ABSTRACT

Segmented, melt-processible, semicrystalline copolyimides are disclosed herein. These polymers are comprised of an amorphous or semicrystalline A segment (soft segment) and a semicrystalline B segment (hard segment), wherein the level of semicrystallinity in the A segment is less than that in the B segment. These copolyimides are semicrystalline and exhibit melting points in the range from about 330–395° C. In preferred embodiments, these copolyimides are end-capped and are crystallizable from their melts (i.e., they exhibit recoverable semicrystallinity). These copolyimides either inherently have suitably low melt visocosities to be melt-processible or can be made to have suitably low melt viscosities to be melt-processible by addition of certain additives. Tailoring of the melting points and glass transition temperatures of these copolyimides can be effected by changing their molecular architecture.

9 Claims, No Drawings

OTHER PUBLICATIONS

Derwent Patent Abstracts, AN 1989–042651 & JP 63314241, Kanegafuchi Chem KK, Sep. 23, 1993.
Derwent Patent Abstracts, AN 1989–042650 & JP63314240, Kanegafuchi Chem KK, Sep. 23, 1993.
Derwent Patent Abstracts, AN 1987–238816 & JP 62161831, Toray Ind. Inc., Sep. 22, 1993.
Derwent Patent Abstracts, AN 1992–068366 & JP 04011632, Kanegafuchi Chem KK, Oct. 6, 1993.
Derwent Patent Abstracts, AN 1989–065020 & JP 01016832, Kanegafuchi Chem KK, Sep. 23, 1993.

V. Ratta, A. Ayambem, J. E. Mc Grath, G. L. Wilkes, "Crystallization and multiple melting behavior of a new semicrystalline polyimide based on 1,3–bis(4–aminophenoxy)benzene (TPER) and 3,3',4,4'–biphenonetetracarboxylic dianhydride (BTDA)," *Polymer* 42 (2001), 6173–6186, Elsevier Science Ltd.

S. Tamai, T. Kuroki, A. Shibuya, A. Yamaguchi, "Snythesis and characterization of thermally stable semicrystalline polyimide based on 3,4'–oxydianiline and 3,3',4,4'–biphenyltetracarboxylic dianhydride," *Polymer* 42 (2001), 2373–2378, Elsevier Science Ltd.

MELT-PROCESSIBLE SEMICRYSTALLINE BLOCK COPOLYIMIDES

FIELD OF THE INVENTION

This invention relates to selected block copolyimide compositions each of which can be processed as a melt and is semicrystalline. In preferred embodiments, these block copolyimides exhibit recoverable crystallinity upon cooling from their respective melts.

BACKGROUND OF THE INVENTION

Polyimides constitute a class of valuable polymers being characterized by thermal stability, inert character, usual insolubility in even strong solvents, and high glass transition temperature ($T_g$) among others. Prior art discloses that their precursors have heretofore been polyamic acids, which may take the final imidized form either by thermal or chemical treatment.

Polyimides have always found a large number of applications requiring the aforementioned characteristics in numerous industries, and currently their applications continue to increase dramatically in electronic devices, especially as dielectrics.

Different aspects regarding polyimides and copolyimides may be found in a number of publications, such as for example:

Sroog, C. E., *J. Polymer Sci.*: Part C, No. 16 1191 (1967).
Sroog, C. E., *J. Polymer Sci.: Macromolecular Reviews*, Vol. 11, 161 (1976).
*Polyimides*, edited by D. Wilson, H. D. Stenzenberger, and P. M. Hergenrother, Blackie, USA: Chapman and Hall, New York, 1990.

Several terms are defined below which are used in accordance with the present invention of high performance block polyimides that possess simultaneously the following desirable properties: high thermal stability, such that they can be processed in the melt, and which in preferred embodiments exhibit recoverable semicrystallinity upon crystallization from the melt.

The term "melt-processible polyimide" means that the polyimide has sufficiently high thermoxidative stability and sufficiently low melt viscosity at temperatures at or above the melting point of the polyimide such that the polyimide can be processed in the melt to form a shaped object (e.g., extruded into a pellet, etc.) without the polyimide undergoing any significant degradation.

The term "DSC" is an acronym for differential scanning calorimetry, a thermal analysis technique widely used for accurately determining various thermal characteristics of samples, including melting point, crystallization point, and glass transition temperature. The acronym "DSC" is employed in text that follows below. The following definitions of slow, intermediate, and fast crystallization kinetics and related terms are based upon behavior of a given sample during DSC analysis under slow cooling, quench cooling, reheat, etc. scans during the DSC analysis (see infra for details).

The term "slow crystallization kinetics" means that the crystallization kinetics are such that, for a given copolyimide sample, the sample, when subjected to DSC analysis, essentially does not show any crystallization during slow cooling (i.e., cooling at 10° C./minute) from its melt but does exhibit a crystallization peak on subsequent reheat. Furthermore, no crystallization occurs upon quench cooling.

The term "intermediate crystallization kinetics" means that the crystallization kinetics are such that, for a given copolyimide sample, when subjected to DSC analysis, the sample exhibits some crystallization on slow cooling and furthermore does exhibit some crystallization on reheat after slow cooling. Furthermore, there is no strong evidence for crystallization occurring upon quench cooling.

The term "fast crystallization kinetics" means that the crystallization kinetics are such that, for a given copolyimide sample, when subjected to DSC analysis the sample does exhibit crystallization peaks in both slow and quench cooling and furthermore no observable crystallization peak is seen on subsequent reheat of a given sample following slow cooling. After quench cooling, there may be some crystallization exhibited on reheat.

The term "melt of a polymer" means the polymer exists as the melt in a liquid or substantially liquid state. If the polymer is crystalline or semicrystalline, a melt of the polymer is necessarily at a temperature greater than or equal to its melting point ($T_m$).

The term "recoverable semicrystallinity" and/or "recoverable crystallinity" refers to behavior occurring in a semicrystalline or crystalline polymer and specifically means the behavior that occurs when the polymer, upon heating to a temperature above its melting point and subsequent slow cooling to a temperature well below its melting point, exhibits a melting point in a reheat DSC scan. (If a melting point is not observed during the reheat DSC scan, the polymer does not exhibit recoverable crystallinity. The longer a sample is below $T_m$ but above $T_g$, the greater probability it has to crystallize.)

The term "semicrystalline polymer" means a polymer that exhibits at least some crystalline characteristics and is partially but not completely crystalline. Most or all known polymers having crystalline characteristics are semicrystalline, but not totally crystalline, since they also have at least some amorphous characteristics. (Hence the term crystalline polymer is technically a misnomer in most or all instances where it is used, but nevertheless this term is often used.)

The term "uncapped copolyimide (random or block)" means a copolyimide that is the reaction product of a set of monomers (e.g., dianhydride(s) and diamine(s)) that does not include an endcapping agent.

Some significant advantages of melt processing in accordance with the present invention include processing without a solvent such that tedious and costly solvent recycling is unnecessary and can be eliminated. High thermal stability is not only essential for processing in the melt at temperatures of greater than or equal to 350° C. but also is required for polyimides used in high temperature applications. Semicrystalline polyimides are often highly desirable in comparison to otherwise comparable polyimides that are amorphous, since the former in relation to the latter often exhibit superior properties, such as having better mechanical properties (e.g., especially higher modulus), capability for use at higher temperatures without property degradation (e.g., better solder resistance, modulus retention), higher solvent resistance, higher creep viscosities (e.g., lower tendencies for distortion of a film or other structure with time), and lower coefficients of thermal expansion.

In order for a semicrystalline polyimide to be considered melt-processible, the polyimide must possess a melting point at or below a temperature in the range of about 385° C.–395° C., which temperature range is a practical limit for melt processing due to both equipment capabilities/limitations and to avoid any significant thermal degradation of the polyimide. Furthermore, the polyimide also must possess a sufficiently low melt viscosity (i.e., less than or equal to a maximum of about $10^8$ poise (which is equal to $10^7$ Pascal-seconds), but preferably $10^4$ poise (which is equal to $10^3$ Pascal-seconds) or less, depending on polymer melt temperature and shear rates of the melt processing equipment). Copolymerization can be used to lower the melting temperature of a polymer (e.g., polyimide) but usually results in loss of crystallinity. Prior art polyimide compositions have been unable to achieve suitable reduction in the melting points ($T_m$s) of the copolymeric compositions while simultaneously maintaining high degrees of semi-crystallinity in the copolymeric compositions. In the compositions of this invention, both suitable melting temperatures and high degrees of semi-crystallinity are achieved by judicious choice of comonomers and endcapping agents, and their relative amounts in each block of these block copolyimide compositions.

Polyimides that exhibit a melting point in an initial DSC heat scan and which are thereby attributed to have crystalline characteristics are disclosed in Kunimune, U.S. Pat. No. 4,923,968 to Chisso Corporation. While the copolyimides disclosed in this patent may be crystalline or semicrystalline until heated to temperatures above their melting points, the present inventors have not observed the copolyimides disclosed in this patent to exhibit recoverable recrystallinity. Indeed these copolyimides are probably substantially amorphous when cooled from their melts. Furthermore, most or all of the copolyimides disclosed in this patent are not melt-processable, because they have melting points and/or molecular weights (melt viscosities) that are too high for melt-processibility. In addition, endcapping in order to moderate the polymerization and improve melt processibility is not taught.

The selected block copolyimides of this invention overcome the drawbacks of the prior art compositions in that these copolyimides possess simultaneously these key essential properties—high thermal stability, melt-processibility, and, in preferred embodiments, recoverable crystallinity. The copolyimides of this invention can therefore be processed in the melt to form articles, which may have a predetermined shape, such as extrudates, fibers, films, and molded products comprised of these semicrystalline copolyimides.

It is known that some properties of a polymer may be best controlled and diversified by using segmented or block copolymers (the words "block" and "segment" regarding copolymers are used in this discussion as synonyms), wherein each of the segments or blocks provides a special and desirable character or property. A classic example is that of the styrene/butadiene block copolymers, wherein the styrene blocks provide stiffness and the butadiene blocks provide elasticity, stiffness and elasticity being two major components of toughness. The desired mechanical properties realized by block polymerization of the styrene and butadiene blocks cannot be realized by random polymerization, despite the fact that the empirical formula, molecular weight, and other parameters may be kept constant in both cases.

Thus, a large number of attempts have been made to duplicate this block concept in the case of polyimides, in order to control their properties to better fit the requirements of a given specific application. However, all these prior attempts have been either partially or totally unsuccessful. Some properties of polyimides that likely contribute to these earlier unsuccessful attempts are described infra.

First, polyimides are valuable because they are normally insoluble in most or all of the common solvents. Therefore, they also possess high solvent resistance. However, this beneficial property itself becomes a heavy burden regarding the way to apply a highly insoluble polyimide in the form of a coating, for example. Thus, the most common technique in the prior art of applying polyimides as coatings is to use a solution of the respective poly(amic acid), which is considerably more soluble, and then after the application, convert the polyamic acid to the corresponding imide by either heat or chemical means. An alternate way, also useful in the preparation of segmented polyimides, is to employ soluble oligomers or precursors (often esters), which have functional terminal groups, such as for example isocyanates, epoxides, acetylenically and ethylenically unsaturated groups, and the like, and then extend them or crosslink them. These functional groups, however, are sources of decreased thermooxidative stability, and they may cause in general deterioration of polymer properties.

Second, a special characteristic of poly(amic acids), which are for all practical purposes the reaction products of carboxylic acid dianhydrides with diamines, is that they are perpetually in a status of dynamic equilibrium, in a way that their components (diamines and dianhydrides) continuously interchange positions, depending on the factors which drive said equilibrium, in contrast with polyimides, which typically do not undergo such changes. Poly(amic acid) equilibration is further detailed by C. C. Walker, *J. Polym. Sci.; Part A: Polym. Chem. Ed.*, 26, 1649 (1988). Reequilibration of binary poly(amic acid) mixtures is discussed by M. Ree, D. Y. Yoon, W. Volksen; "Miscibility Behavior and Reequilibration of Binary Poly(Amic Acid) Mixtures", Polymeric Materials; Science & Engineering Proceedings of ACS Division of Polymeric Materials; V60; p.179–182; Spring 1989. On the other hand, equilibration in the case of aromatic polyimides requires stringent conditions, such as for example described by Takekoshi, T., "Synthesis of Polyetherimides by Transimidization Reaction", preprints of symposium on Recent Advances in Polyimides and Other High Performance Polymers, Div. Of Polymer Chemistry, Am. Chem. Soc., San Diego, Calif., January 1990.

As a result of the above-described dynamic equilibrium present in a poly(amic acid), it is generally not feasible to react two different polyamic acids together with comcomitant or subsequent imidization to synthesize a segmented copolyimide having two well-defined types of segments.

In U.S. Pat. No. 5,202,412, there are disclosed polyimide copolymer oligomeric precursors that are soluble in polar solvents, a method for making the polyimide precursors, and a method for making a block polyimide copolymer, having a first imidized segment (block) and a second imidized segment (block), wherein the first imidized segment is comprised of a given polyimide precursor. The block polyimide copolymers produced by the method disclosed in this patent possess properties such that amine and anhydride rearrangment is substantially prevented 1) within the first imidized segment, and 2) between the first imidized segment and the second amic acid segment (which is precursor to the second imidized segment). There are no teachings though in this patent with regard to how block copolyimides can be melt-processible and/or exhibit recoverable recrystallinity.

In view of the discussion presented above, there are significant long-felt needs not met by the current state of polyimide art for high performance polyimides that possess high thermal stability, which can be processed in the melt (melt-processible), and which, in preferred embodiments, exhibit recoverable semicrystallinity as defined herein. This invention provides a solution to these long-felt needs.

SUMMARY OF THE INVENTION

In one embodiment of the invention is a segmented, melt-processible, semicrystalline polyimide copolymer comprising a first imidized segment and a second imidized segment prepared by the steps of:

a) preparing a first amic acid segment, the first amic acid segment being a precursor of the first imidized segment and being the reaction product of reacting a first acid dianhydride with a first diamine in a molecular ratio to obtain the first amic acid segment having two identical terminal portions selected from the group consisting of acid anhydride and amine, whereby combinations of the first acid dianhydride and the first diamine for forming the first amic acid segment respectively are selected from the group consisting of 4,4'-oxydiphthalic anhydride (ODPA) and 1,3-bis(3-amino-phenoxy)benzene (APB-133) in combination; (3,3',4,4'-biphenyltetracarboxylic dianhydride (BPDA) and 1,3-bis(3-aminophenoxy) benzene (APB-133) in combination; pyromellitic dianhydride (PMDA) and 1,3-bis(3-aminophenoxy) benzene (APB-133) in combination; (2,2'-bis-(3,4-dicarboxyphenyl)hexa-fluoropropane dianhydride (6FDA) and 1,3-bis(3-aminophenoxy)benzene (APB-133) in combination; 3,3',4,4'-diphenylsulfone tetracarboxylic dianhydride (DSDA) and 1,3-bis(3-aminophenoxy)benzene (APB-133) in combination; and (2,2'-bis-(3,4-dicarboxyphenyl) hexafluoropropane dianhydride (6FDA) and 1,3-bis(4-aminophenoxy) benzene (APB-134) in combination;

b) imidizing the first amic acid segment to form the first imidized segment;

c) reacting the first imidized segment with reactant(s) selected from the group consisting of 1) a second acid dianhydride and a second diamine and 2) a second amic acid segment and a linking monomer selected from the group consisting of the second acid dianhydride and the second diamine;

whereby the first imidized segment reacts with reactant (s) to form a segmented polyimide/polyamic acid copolymer comprising the first imidized segment and the second amic acid segment, with the proviso that the choice in selection of the linking monomer between diamine and dianhydride in 2) is made by choosing that linking monomer needed to result in the polyimide/polyamic acid copolymer having overall stoichiometry of about 100%, whereby the second amic acid segment is attached to the first imidized segment through an amide group having a carbon-nitrogen bond, whereby combinations of the second acid dianhydride and the second diamine for forming the second amic acid segment respectively are selected from the group consisting of 3,3',4,4'-biphenyltetracarboxylic dianhydride (BPDA) and 1,3-bis(4-aminophenoxy) benzene (APB-134) in combination; and (3,3',4,4'-benzophenone tetracarboxylic dianhydride (BTDA) and 1,3-bis(4-aminophenoxy)benzene (APB-134) in combination; and d) imidizing the second amic acid segment to form the second imidized segment and thus resulting in formation of the segmented, melt-processible, semicrystalline polyimide copolymer.

In this invention, it is essential and required that at least one of the first imidized segment and the second imidized segment comprise imide repetition units that impart semicrystallinity to a corresponding homopolyimide containing the imide repetition units. Furthermore, it is essential that the first imidized segment be soluble in the reaction solvent(s) at reaction temperature(s) for forming the segmented polyimide/polyamic acid copolymer.

In a preferred embodiment, a copolyimide of this invention has a stoichiometry in the range from 93% to 98%, exhibits a melting point in the range of 330° C. to 395° C., and exhibits recoverable crystallinity as determined by DSC analysis. Preferably, each copolyimide of this invention has a melting point under 385° C. and, more preferably, under 380° C.

As used herein the term "stoichiometry", expressed as a percent, means total moles of dianhydride(s) in relation to total moles of diamine(s) that are incorporated in a given polyimide. If the total moles of dianhydride(s) equals the total moles of diamine(s), the stoichiometry is 100 percent. If these two numbers are not equal, either total diamine(s) or total dianhydride(s) is present in higher amount, and the stoichiometery in this case is expressed as the mole percentage of component(s) (diamine(s) or dianhydride(s)) present in lesser amount relative to that component(s) present in higher amount and expressed as 100 percent. As one example, if a polyimide sample is derived from incorporation of 0.98 mole of dianhydride(s) and 1.00 mole of diamine(s), the diamine(s) is present in higher amount and the stoichiometery is 98%.

If the stoichiometry is less than 93%, the copolyimides possess poor mechanical properties. If the stoichiometry is greater than 98%, the copolyimides are too high melting for melt-processibility to be feasible and/or do not exhibit recoverable crystallinity.

As used herein the term "endcapping" refers to the monofunctional component(s) (agent(s)) including, but not limited to, phthalic anhydride, naphthalic anhydride, and aniline, which cap the copolyimides to moderate the polymerization and to enhance thermoplasticity of the final melt polymerized product. Endcapping is generally done to 100% such that total moles of anhydride functionality are equal to total moles of amine functionality. Phthalic anhydride and naphthalic anhydride are suitable endcapping components in those cases where diamines are present in greater molar amounts than are dianhydrides. Aniline is a suitable endcapping component in those cases where dianhydrides are present in greater molar amounts than are diamines. The percentage of endcapping component required to afford 100% endcapping is equal to twice the value of (1−stoichiometry) multiplied by 100. As an example, for a 100% endcapped copolyimide with 95% stoichiometry (diamine in excess), the total moles of the endcapping agent must be 10 mole percent of the total moles of the diamines, i.e., 10 moles of the endcapping agent to 100 moles of the diamines.

In another embodiment, the invention is a segmented polyimide/polyamic acid copolymer comprising a first imidized segment and a second amic acid segment prepared by the steps of:

a) preparing a first amic acid segment, the first amic acid segment being a precursor of the first imidized segment and being the reaction product of reacting a first acid dianhydride with a first diamine in a molecular ratio to obtain the first amic acid segment having two identical terminal portions selected from the group consisting of acid anhydride and amine, whereby combinations of the first acid dianhydride and the first diamine for forming the first amic acid segment respectively are selected from the group consisting of 4,4'-oxydiphthalic anhydride (ODPA) and 1,3-bis(3-amino-phenoxy)benzene (APB-133) in combination; (3,3',4,4'-biphenyltetracarboxylic dianhydride (BPDA) and 1,3-bis(3-aminophenoxy) benzene (APB-133) in combination; pyromellitic dianhydride (PMDA) and 1,3-bis(3-aminophenoxy)-benzene (APB-133) in combination; (2,2'-bis-(3,4-dicarboxyphenyl)hexa-fluoropropane dianhydride (6FDA) and 1,3-bis(3-aminophenoxy)benzene (APB-133) in combination; 3,3',4,4'-diphenylsulfone tetracarboxylic dianhydride (DSDA) and 1,3-bis(3-aminophenoxy)benzene (APB-133) in combination; and (2,2'-bis-(3,4-dicarboxyphenyl) hexafluoropropane dianhydride (6FDA) and 1,3-bis(4-aminophenoxy) benzene (APB-134) in combination;

b) imidizing the first amic acid segment to form the first imidized segment; and c) reacting the first imidized segment with reactant(s) selected from the group consisting of 1) a second acid dianhydride and a second diamine and 2) a second amic acid segment and a linking monomer selected from the group consisting of the second acid dianhydride and the second diamine;

whereby the first imidized segment reacts with reactant (s) to form the segmented polyimide/polyamic acid copolymer comprising the first imidized segment and the second amic acid segment, with the proviso that the choice in selection of the linking monomer between diamine and dianhydride in 2) is made by choosing that linking monomer needed to result in the polyimide/polyamic acid copolymer having overall stoichiometry of about 100%, whereby the second amic acid segment is attached to the first imidized segment through an amide group having a carbon-nitrogen bond, whereby combinations of the second acid dianhydride and the second diamine for forming the second amic acid segment respectively are selected from the group consisting of 3,3',4,4'-biphenyltetracarboxylic dianhydride (BPDA) and 1,3-bis(4-aminophenoxy) benzene (APB-134) in combination; and (3,3',4,4'-benzophenone tetracarboxylic dianhydride (BTDA) and 1,3-bis(4-aminophenoxy)benzene (APB-134) in combination. This segmented polyimide/polyamic acid copolymer is a precursor to the aforementioned segmented polyimide copolymer.

DETAILED DESCRIPTION OF THE INVENTION

Novel segmented (block) copolyimides having suitable molecular architectures are defined herein such that these copolyimides are semicrystalline, crystallizable from the melt, and are melt-processible. Furthermore, in preferred embodiments, these copolyimides exhibit recoverable semicrystallinity. These block copolyimides have melting points in the range from about 330° C. to about 385° C.–395° C. Key melt-processibility parameters, including melting point and melt viscosity at melting temperature(s), can be tailored by appropriate choices of monomers, block length, molecular weights, and percentage of endcapping. Use of suitable molecular architecture in the inventive copolyimides also affords control of a window of temperature difference between the melting point and the glass transition temperature.

A key aspect of the invention is the surprising discovery that retention of crystallizability upon cooling from a melt of a given copolyimide while reducing melting point and other desirable properties occurs in inventive segmented (block) copolyimides when they are produced using sequenced polymerization. It is highly desirable to have semicrystalline polyimides that retain strength above the glass transition temperature and which then melt at even a higher temperature for fabrication. It has been discovered that comonomer or copolymer units that are amorphous and which destroy crystallizability when randomly placed in the chain of a crystallizable thermoplastic polyimide, unexpectedly will retain crystallizability and will lower crystalline melting when copolymerized in a sequenced way. This sequenced copolymerization is accomplished by ordered addition of monomers, or polymerization of amorphous and crystallizable polymers separately, followed by combination and chain extension. New compositions of matter have been made in this invention which are crystallizable above the glass transition temperature, and which melt at lower, more practical temperatures for fabrication of films, fibers and molded parts.

Fabrication of semicrystalline thermoplastic polyimides generally requires molding and extrusion temperatures in the vicinity of about 330–395° C., with approximately 385–395° C. being at the upper limit for melt processibility to be feasible using current state of the art high temperature equipment and to prevent any significant thermal degradation of polyimide from occurring. Random copolymerization may destroy crystalline characteristics, but sequenced copolymerization more readily retains crystallizability and lowers the crystalline melting point. Lower and more practical fabrication temperatures are thereby achieved with this invention.

Semicrystalline all-aromatic homopolyimides often have melting points at or above the upper limit where melt-processibility is feasible. An example is BPDA/APB-134 homopolyimide, which has a melting-point of about 400° C. (See Comparative Example 3) and which is considered too high for practical melt-processibility.

In this invention, a key feature is that surprisingly and unexpectedly copolymerization in a sequenced manner to produce the inventive segmented copolyimides results in controlled lowering of the melting points of these copolyimides while preserving the crystallizability of these copolymides from their respective melts and which thereby imparts recoverable crystallinity characteristics to these block copolyimides.

The segmented (block) copolyimides of this invention are characterized in having structures comprised of A//B segments or blocks, where A represents an amorphous or semicrystalline segment and B represents a semicrystalline segment. The A segment (block) is termed a soft segment, while the B segment (block) is termed a hard segment. While both A and B can be semicrystalline provided the A segment is sufficiently soluble in a suitable solvent (e.g., DMAC, NMP) at process temperature(s) for forming the A/B polyimide/poly(amic acid) copolymer, A and B segments are always structurally different and are not identical. Preferably, the A segment is amorphous or only slightly to moderately semicrystalline while the B segment is semicrystalline. Key attributes of the A segment include solubility of homopolyimide comprised of A segments in organic solvents (DMAC, etc.) and ability to reduce the melting point of block copolymers comprised of B segments without destroying the recoverable crystallinity. Key attributes of the B segment include its possessing recoverable crystallinity and its affording a melting point to the block copolyimide of equal to or less than about 395° C., and preferably less than or equal to 385° C.

The invention is in one embodiment a segmented polyimide/polyamic acid copolymer comprising a first imidized segment and a second amic acid segment.

The first imidized segment, which is derived from a first amic acid segment as precursor, is obtained by first reacting a first acid dianhydride with a first diamine in a molecular ratio to obtain the first amic acid segment having two identical terminal portions selected from the group consisting of acid anhydride and amine. Subsequently, the first amic acid segment is imidized to form the first imidized segment. Preferably, the first imidized segment is anhydride terminated.

The first acid dianhydride and the first diamine for forming the first imidized segment via the first amic acid segment as precursor (independently of the second acid dianhydride and the second diamine) are respectively selected from the group consisting of ODPA and APB-133 in combination; BPDA and APB-133 in combination; PMDA and APB-133 in combination; 6FDA and APB-133 in combination; DSDA and APB-133 in combination; and 6FDA and APB-134 in combination. The first acid dianhydride and the first diamine are preferably respectively selected from the group consisting of ODPA and APB-133 in combination; BPDA and APB-133 in combination; PMDA and APB-133 in combination; and 6FDA and APB-134 in combination; more preferably respectively selected from the group consisting of ODPA and APB-133 in combination; BPDA and APB-133 in combination; and PMDA and APB-133 in combination; and most preferably respectively selected from the group consisting of ODPA and APB-133 in combination, and BPDA and APB-133 in combination. For special applications requiring a material having low dielectric constant, the first acid dianhydride and the first diamine are preferably either 6FDA and APB-134 in combination, or 6FDA and APB-133 in combination, respectively.

The second amic acid segment in the segmented polyimide/polyamic acid copolymer is obtained by reacting the first imidized segment with reactant(s) which are either 1) a second acid dianhydride and a second diamine or 2) a second amic acid segment and a linking monomer selected from the group consisting of the a dianhydride and a diamine; to form the second amic acid segment, which is attached to the first imidized segment through an amide group having a carbon-nitrogen bond.

In case of 1) above, suitable combinations of the second acid dianhydride and the second diamine for forming the second amic acid segment (independently of the first acid dianhydride and the first diamine) are respectively selected from the group consisting of BPDA and APB-134 in combination; and BTDA and APB-134 in combination. The second acid dianhydide and the second diamine are, respectively, preferably BPDA and APB-134 in combination.

In case of 2) above, suitable second amic acid segments are BPDA/APB-134 and BTDA/APB-134. Examples 22-27 exemplify this case 2) with the second amic acid segment being BPDA/APB-134, which contained 98% of the stoichiometric amount of BPDA and hence had excess amino functionality. Hence, in these examples having excess amino functionality, a dianhydride, rather than a diamine, is used as a linking monomer to link the first imidized segment with the second amic acid segment and to raise the overall stoichiometry of the segmented copolyimide towards about 100%. In Examples 22–27, BPDA was used as linking monomer, but any other dianhydride can be used as linking monomer in this invention. Similarly, in cases where the second amic acid has excess dianhydride functionality, any diamine can be used as the linking monomer according to the invention.

When the second acid dianhydride and the second diamine are most preferably BPDA and APB-134, respectively, suitable combinations of the first acid dianhydride and the first diamine for forming the first imidized segment via the first amic acid segment as precursor are selected respectively from the group consisting of ODPA and APB-133 in combination; BPDA and APB-133 in combination; PMDA and APB-133 in combination; 6FDA and APB-133 in combination; DSDA and APB-133 in combination; and 6FDA and APB-134 in combination. Preferably, the first acid dianhydride and the first diamine for forming the first amic acid and first imidized segments are respectively selected from the group consisting of ODPA and APB-133 in combination; BPDA and APB-133 in combination; and PMDA and APB-133 in combination. More preferably, the first acid dianhydride and the first diamine for forming the first amic acid and first imidized segments are respectively selected from the group consisting of ODPA and APB-133 in combination, and BPDA and APB-133 in combination. Most preferably, the first acid dianhydride and the first diamine for forming the first amic acid and first imidized segment are respectively ODPA and APB-133 in combination.

The invention is in another embodiment a segmented melt-processible polyimide copolymer comprising a first imidized segment and a second imidized segment.

The first imidized segment is obtained by reacting a first acid dianhydride with a first diamine in a molecular ratio to obtain a first amic acid segment as precursor having two identical terminal portions selected from the group consisting of acid anhydride and amine. Subsequently, the first amic acid segment is imidized to form the first imidized segment.

The first acid dianhydride and the first diamine for forming the first imidized segment via the first amic acid segment as precursor (independently of the second acid dianhydride and the second diamine) are respectively selected from the group consisting of ODPA and APB-133 in combination; BPDA and APB-133 in combination; PMDA and APB-133 in combination; 6FDA and APB-133 in combination; DSDA and APB-133 in combination; and 6FDA and APB-134 in combination. The first acid dianhydride and the first diamine are preferably respectively selected from the group consisting of ODPA and APB-133 in combination; BPDA and APB-133 in combination; PMDA and APB-133 in combination; and 6FDA and APB-134 in combination; more preferably respectively selected from the group consisting of ODPA and APB-133 in combination; BPDA and APB-133 in combination; and PMDA and APB-133 in combination; and most preferably respectively selected from the group consisting of ODPA and APB-133 in combination, and BPDA and APB-133 in combination. For special applications requiring a material having low dielectric constant, the first acid dianhydride and the first diamine respectively are preferably either 6FDA and APB-134 in combination, or 6FDA and APB-133 in combination.

The second imidized segment of the segmented copolyimide of this invention is obtained by reacting the first imidized segment with reactant(s) which are either 1) a second acid dianhydride and a second diamine or 2) a second amic acid segment and a linking monomer selected from the group consisting of the a dianhydride and a diamine; to form the second amic acid segment, which is attached to the first imidized segment through an amide group having a carbon-nitrogen bond and subsequently imidizing the second amic acid segment to form the second imidized segment, whereby combinations of the second acid dianhydride and the second diamine for forming the second segment (independently of the first acid dianhydride and the first diamine) are respectively selected from the group consisting of BPDA and APB-134 in combination; and BTDA and APB-134 in combination. The second acid dianhydide and the second diamine are, respectively, preferably BPDA and APB-134 in combination.

When the second acid dianhydride and the second diamine are most preferably BPDA and APB-134, suitable combinations of the first acid dianhydride and the first diamine for forming the first segment are respectively selected from the group consisting of ODPA and APB-133 in combination; BPDA and APB-133 in combination; PMDA and APB-133 in combination; 6FDA and APB-133 in combination; DSDA and APB-133 in combination; and 6FDA and APB-134 in combination. Preferably, the first acid dianhydride and the first diamine for forming the first segment are respectively selected from the group consisting of ODPA and APB-133 in combination; BPDA and APB-133 in combination; and PMDA and APB-133 in combination. More preferably, the first acid dianhydride and the first diamine for forming the first segment are respectively selected from the group consisting of ODPA and APB-133 in combination, and BPDA and APB-133 in combination. Most preferably, the first acid dianhydride and the first diamine for forming the first segment respectively are ODPA and APB-133 in combination.

The segmented, melt-processable polyimide copolymers of this invention has a second segment (B segment) that is semicrystalline. Preferably, the second segment is present in the copolymer at a level of greater than or equal to 60 weight percent. More preferably, the semicrystalline segment is present in the copolymer at a level in the range of 65 to 85 weight percent, and still more preferably, the semicrystalline segment is present in the copolymer at a level in the range of 75 to 85 weight percent.

The segmented, melt-processable polyimide copolymers of this invention are comprised of a first imidized segment that has number average molecular weight (as determined by gel permeation chromatography on the precursor segmented polyimide/polyamic acid copolymers) in the range of about 2,000 to about 20,000; preferably the first segment has $M_n$ in the range of 3,000 to 15,000, more preferably the first segment has $M_n$ in the range of 4,000 to 10,000, and most preferably the first segment has $M_n$ in the range of 4,000 to 8,000.

The number average molecular weight ($M_n$) of the first imidized segment can be set quite closely by using stoichiometric imbalance calculations (i.e., employing the Carothers equation) to determine the required off-stoichiometry amounts of the first dianhydride and the first diamine necessary for a given molecular weight of first imidized segment. Such calculations were made as are described in many polymer textbooks, such as, for example, *Principles of Polymerization*, Third Edition, by George Odian, John Wiley and Sons, Inc., New York (1991), p. 82–87.

As illustrated in some of the examples, number average molecular weights for selected first imidized segments as determined by titrimetic analysis were in excellent agreement with the calculated molecular weights based on stoichiometric imbalance.

This invention encompasses both segmented, melt-processable, semicrystalline polyimide copolymers and their precursors, segmented polyimide/polyamic acid copolymers. Conversion of amic acid segments to corresponding imidized segments can be effected using thermal imidization and/or chemical imidization as is known to those skilled in this art (see following paragraph).

As illustrated in many textbooks and other references (e.g., for example, see Polyimides, edited by D. Wilson, H. D. Stenzenberger, and P. M. Hergenrother, Blackie, USA: Chapman and Hall, New York, 1990), reaction of a dianhydride(s) with a diamine(s) in solution initially affords a poly(amic acid). Typical reaction temperatures are ambient temperature to about 100° C. The poly(amic acid) that results can subsequently be converted to the corresponding polyimide (and water) by either heating the poly(amic acid) to elevated temperature(s) (e.g., about 200–400° C.) and/or subjecting the poly(amic acid) to chemical imidization using reagents such as triethylamine in combination with acetic anhydride.

GLOSSARY

Diamines
    APB-133—1,3-bis(3-aminophenoxy)benzene
    APB-134—1,3-bis(4-aminophenoxy)benzene (=RODA)
    RODA—1,3-bis(4-aminophenoxy)benzene (=APB 134)

Dianhydrides
    BPDA—3,3',4,4'-biphenyltetracarboxylic dianhydride
    BTDA—3,3',4,4'-benzophenone tetracarboxylic dianhydride
    DSDA—3,3',4,4'-diphenylsulfone tetracarboxylic dianhydride
    6FDA—2,2'-bis-(3,4-dicarboxyphenyl) hexafluoropropane dianhydride
    ODPA—4,4'-oxydiphthalic anhydride
    PMDA—pyromellitic dianhydride General
    AA—Acetic anhydride
    CTE—Coefficient of thermal expansion DSC—Differential scanning calorimetry
    hr(s)—hour(s)
    lb(s)—pound(s)
    RPM—Revolutions per minute
    TEA—Triethylamine
    g—gram
    GPa—Gigapascals
    GPC—Gel permeation chromatography
    J/g—Joules per gram
    $M_n$—Number average molecular weight (determined by GPC unless otherwise specified)
    $M_n$(tit)—Number average molecular weight determined titrimetrically
    $M_w$—Weight average molecular weight (determined by GPC unless otherwise specified)
    $M_w$(tit)—Weight average molecular weight determined titrimetrically
    MPa—Megapascals
    O/P(X)//Q/R(Y) Block copolyimide comprised of first imidized segments derived from O and P monomers, where O is the first dianhydride and P is the first diamine, and second imidized segments derived from Q and R monomers, where Q is the second dianhydride and R is the second diamine. The first and second imidized segments, respectively, are present at levels of X mole percent and Y mole percent in the block copolyimide.
    PA—Phthalic anhydride
    $T_g$—Glass transition temperature
    $T_m$—Melting point (° C. unless otherwise specified)

Solvents
  DMAC—N,N-dimethylacetamide
  NMP—N-methyl-2-pyrrolidinone
Miscellaneous
  Poly(amic acid)=polyamic acid=initial reaction product of a dianhydride with a diamine and precursor to a polyimide.

EXAMPLES

Examples 1–21 and Comparative Examples 1–4

General

All of the block copolyimides were synthesized using the general synthetic methodology disclosed in U.S. Pat. No. 5,202,412. The dianhydrides and diamines used were all high purity polymer grade. Anhydrous N-methyl-2-pyrrolidinone (NMP) was employed as the solvent. An aromatic hydrocarbon mixture (Aromatic 150 from Exxon) was employed as an azeotroping agent in synthesizing these copolyimides. The same monomers, solvents, etc. were used also to synthesize the random copolyimides for the comparative examples. Prior to their use, all monomers were dried overnight at 40–50° C. for diamines and 160° C. for dianhydrides and then placed in bottles which were tightly closed and and then stored in a dessicator. GPC molecular weights reported infra are relative values.

Example 1

The synthesis of uncapped ODPA/APB-133(50)//BPDA/APB-134(50) block copolyimide with a flexible block ("A" block) molecular weight of ~10000 g/mole (as PI) was run as described below. The resulting sample was an uncapped block copolyimide.

A dry 4-neck, 250 ml round-bottomed flask equipped with a mechanical stirrer, nitrogen inlet, Dean-Stark trap/condenser, and thermometer (reading to ~250° C.) was set-up and dried using a heat gun just prior to start of the reaction sequence. To the reaction flask were added 8.1290 g of ODPA and NMP (30 ml), and light stirring was started. APB-133 (7.2389 g) was weighed into a container with lid, NMP (30 ml) was added, and the mixture was agitated until all of the APB-133 was in solution. Then the resulting diamine solution was added to the reaction flask with light stirring. NMP (10 ml) was used to rinse the container and the rinsings obtained were added to the flask. (Total ml of NMP added at end of step #3 was 70 ml; mixture was ~17.5% solids.)

The resulting reaction mixture was stirred for 30 minutes.

The Dean-Stark trap was completely filled with Aromatic 150 liquid (from Exxon). Aluminum foil was wrapped around the Dean-Stark trap as thermal insulation. Aromatic 150 liquid (8 ml) was added to the reaction mixture in the pot and the resulting reaction mixture was heated to 180° C. over 90 minutes. The reaction temperature was maintained at 180° C. for 3 hours, during which time there was a steady stream of condensate dripping from the condenser and water collected in the Dean-Stark trap.

The nitrogen flow through the reactor was increased (approximately doubled), pertinent areas of the flask were heated with a heat gun for ~5 minutes to remove condensation lining the flask, and then the nitrogen flow rate was set back to normal. Heating was stopped until the reaction flask had cooled to 45° C. and then the reaction mixture was held at 60–70° C. overnight. (In all subsequent examples related to this one, at this point, heat was applied at a lower setting to maintain the reaction mixture at 45° C. and the BPDA/APB-134 addition described below was done on the same day after the 45° C. temperature was established.)

BPDA (7.4964 g) was added along with 14 ml of NMP (as a rinse) to the reaction mixture while it was being stirred gently. APB-134 (7.8708 g) was weighted into a stoppered vessel, NMP (25 ml) was added, and the resulting mixture was agitated until a solution resulted. The solution was kept stoppered until it was added. The APB-134 solution was added dropwise to the stirred-reaction mixture over 30 minutes using an addition funnel. At the end of the addition, NMP (10 ml) was used for rinsing the stoppered vessel and the resulting rinse was added to the reaction mixture. (The approximate volume of the reaction mixture at this point was 150 ml; 119 ml total of NMP have been added.) The reaction mixture was stirred at 45° C. for 1 hour after addition was complete and then further stirred at ambient temperature overnight. The resulting intermediate product, a polyimide/polyamic acid copolymer, was collected and stored in a dry stoppered jar.

GPC molecular weight determination for this sample as the intermediate polyimide/polyamic acid afforded the following results: $M_w$=352K and $M_n$=162K.

The intermediate polyimide/polyamic acid solution sample from above was converted into a polyimide film sample by spin coating onto a wafer, prebaking at 135° C. for 30 minutes in air, baking for 60 minutes at 350° C. in nitrogen, etching away the wafer support, rinsing the film with water, and then drying to obtain a finished polyimide film sample suitable for characterization studies. This polyimide film exhibited a melting point of 367° C. in an initial DSC scan.

(Comment: In Example 1, the initial reaction mixture after addition of the APB-134 gelled to a rubbery consistency. It was diluted from ~20 weight % solids to ~15% to afford a solution which was successfully spin-coated.)

Example 2

The synthesis of ODPA/APB-133(40)//BPDA/ APB-134 (60) block copolyimide (uncapped) with a 10K "A" block size was run in a similar manner to that described in Example 1 with the monomer amounts adjusted to the following: 8.1277 g of ODPA; 7.2378 g of APB-133; 11.3505 g of BPDA; and 11.6993 g of APB-134. The initial reaction mixture (following addition of BPDA and APB-134 and heating at 45° C.) was highly viscous; it was diluted with 20 ml of anhydrous NMP to afford a medium viscosity reaction mixture which was successfully spin-coated and made into a polyimide film sample for characterization (as in Example 1). This polyimide film exhibited a melting point of 375° C. in an initial DSC scan.

GPC molecular weight analysis of this sample as the intermediate polyimide/polyamic acid afforded the following results: $M_w$=393K and $M_n$=83K.

Example 3

The synthesis of ODPA/APB-133(50)//BTDA/APB-134 (50) block copolyimide (uncapped) with a 5K "A" block size was run in a similar manner to that described in Example 1 with the monomer amounts adjusted to the following: 8.3460 g of ODPA; 7.0210 g of APB-133; 7.6144 g of BTDA; and 7.7540 g of APB-134. The reaction mixture (following addition of BTDA and APB-134 and heating at 45° C.) was stirred at ambient temperature over the weekend to afford a medium viscosity solution, which was directly spin-coated (as in Example 1) into a polyimide film sample for characterization. This polyimide film exhibited a lower melting point of 358° C. and a higher melting point of 391° C. in an initial DSC scan.

GPC molecular weight analysis of this sample as the intermediate polyimide/polyamic acid afforded the following results: $M_w$=98K and $M_n$=50K.

Comparative Example 1

The synthesis of ODPA/APB-133(50)//PMDA/APB-133 (50) block copolyimide (uncapped) with a 5K "A" block size was run in a similar manner to that described in Example 1 with the monomer amounts adjusted to the following: 8.3462 g of ODPA; 7.0201 g of APB-133 (as the first diamine); 5.8130 g of PMDA; and 8.6354 g of APB-133 (as the second diamine). The polyimide/polyamic acid reaction mixture (following addition of the second diamine and the second dianhydride and heating at 45° C.) was stirred overnight in the normal fashion to afford a medium viscosity solution, which was directly spin-coated (as in Example 1) into a polyimide film sample for characterization. This polyimide film did not exhibit a melting point in an initial DSC scan.

GPC molecular weight analysis of this sample as the intermediate polyimide/polyamic acid afforded the following results: $M_w$=64.8K and $M_n$=29.7K.

Comparative Example 2

The synthesis of 6FDA/APB-133(50)//BPDA/4,4'-ODA (50) block copolyimide (uncapped) with a 5K "A" block size was run in a similar manner to that described in Example 1 with the monomer amounts adjusted to the following: 9.5367 g of 6FDA; 5.8308 g of APB-133 (as the first diamine); 8.5340 g of BPDA; and 6.1188 g of 4,4'-ODA (as the second diamine). The polyimide/polyamic acid reaction mixture (following addition of the second diamine and the second dianhydride and heating at 45° C.) was stirred overnight in the normal fashion to afford a medium viscosity solution, which was directly spin-coated into a polyimide film sample for characterization. This polyimide film did not exhibit a melting point in an initial DSC scan.

GPC molecular weight analysis of this sample as the intermediate polyimide/polyamic acid afforded the following results: $M_w$=118K and $M_n$=33.9K.

Comparative Example 3

The synthesis of ODPA/APB-133(50)//DSDA/APB-134 (50) block copolyimide (uncapped) with a 5K "A" block size was run in a similar manner to that described in Example 1 with the monomer amounts adjusted to the following: 8.3450 g of ODPA; 7.0224 g of APB-133 (as the first diamine); 7.9973 g of DSDA; and 7.3693 g of APB-134 (as the second diamine). The polyimide/polyamic acid reaction mixture (following addition of the second diamine and the second dianhydride and heating at 45° C.) was stirred overnight in the normal fashion to afford a medium viscosity solution, which was directly spin-coated into a polyimide film sample for characterization. This polyimide film did not exhibit a melting point in an initial DSC scan.

GPC molecular weight analysis of this sample as the intermediate polyimide/polyamic acid afforded the following results: $M_w$=114K and $M_n$=59.1K.

Comparative Example 4

The synthesis of ODPA/APB-133(50)/BPDA/PPD(50) block copolyimide (uncapped) with a 5K "A" block size was run in a similar manner to that described in Example 1 with the monomer amounts adjusted to the following: 8.3455 g of ODPA; 7.0210 g of APB-133 (as the first diamine); 11.0088 g of BPDA; and 4.3589 g of PPD (as the second diamine). The polyimide/polyamic acid reaction mixture (following addition of the second diamine and the second dianhydride and heating at 45° C.) was stirred overnight in the normal fashion to afford a medium viscosity solution, which was directly spin-coatable into a polyimide film sample for characterization. This polyimide film did not exhibit a melting point in an initial DSC scan.

GPC molecular weight analysis of this sample as the intermediate polyimide/polyamic acid afforded the following results: $M_w$=238K and $M_n$=118K.

Example 4

Differential scanning calorimetry (DSC) was employed (as referenced in the above examples and comparative examples) to characterize the thermal behavior of the three block copolyimide samples shown above in Examples 1–3 together with approximately 15–20 other block copolyimides, some of which given above in Comparative Examples 1–4. A single DSC scan was obtained for each sample from ambient temperature to 500° C. at 20° C./minute scan rate. As indicated in the individual examples, each of the block copolyimide samples from Examples 1–3 exhibited DSC melting point behavior (i.e., exhibited a characteristic melting point curve in the DSC trace), indicating each of these block copolyimides to have semi-crystalline character. In sharp contrast, none of the other 15–20 samples in the set (which included those in Comparative Examples 1–4) exhibited DSC melting point behavior, indicating them to have essentially amorphous character.

Example 5

The synthesis of capped (with phthalic anhydride (PA)) ODPA/APB-133(50)//BPDA/APB-134(50) block copolymer with a flexible block ("A" block) molecular weight of ~10000 g/mole (as PI) was run as described below.

Prior to use, all monomers were dried overnight at 40–50° C. for diamines and 160° C. for dianhydrides and then placed in bottles which were tightly closed and then stored in a dessicator. A dry 4-neck, 250 ml round-bottomed flask equipped with a mechanical stirrer, nitrogen inlet, Dean-Stark trap/condenser, and thermometer (reading to ~250° C.) was set-up and dried using a heat gun just prior to start of the reaction sequence. To the reaction flask were added 8.1288 g of ODPA and NMP (30 ml), and light stirring was started. APB-133 (7.2371 g) was weighed into a container with lid, NMP (35 ml) was added, and the mixture was agitated until all of the APB-133 was in solution. Then the resulting diamine solution was added to the reaction flask with light stirring. NMP (5 ml) was used to rinse the container and the rinsings obtained were added to the flask. (Total ml of NMP added at this point was 70 ml; mixture was ~17.5% solids.) The resulting reaction mixture was stirred for 30 minutes.

The Dean-Stark trap was completely filled with Aromatic 150 liquid (from Exxon). Aluminum foil was wrapped around the Dean-Stark trap as thermal insulation. Aromatic 150 liquid (8 ml) was added to the reaction mixture in the pot and the resulting reaction mixture was heated to 180° C. over ~90 minutes. The reaction temperature was maintained at 180° C. for 3 hours, during which time there was a steady stream of condensate dripping from the condenser and water collected in the Dean-Stark trap. The nitrogen flow through the reactor was increased (approximately doubled), pertinent areas of the flask were heated with a heat gun for ~5 minutes to remove condensation lining the flask, and then the nitrogen flow rate was set back to normal.

Heating was stopped until the reaction flask had cooled to 45° C. and then heat was applied at a lower setting to maintain the reaction mixture at 45° C. BPDA (7.2710 g) was added along with 10 ml of NMP (as a rinse) to the reaction mixture while it was being stirred gently and stirring was continued for 10 minutes. Phthalic anhydride (PA, 0.2264 g) was then added to the reaction mixture using 4 ml of NMP as a rinse. APB-134 (7.8710 g) was weighed into a stoppered vessel, NMP (30 ml) was added, and the resulting mixture was agitated until a solution resulted. The solution was kept stoppered until it was added. The APB-134 solution was added dropwise to the stirred-reaction mixture over 30 minutes using an addition funnel. At the end of the addition, NMP (10 ml) was used for rinsing the stoppered vessel, and the resulting rinse was added to the reaction mixture. (The approximate volume of the reaction mixture at this point was 150 ml; 119 ml total of NMP have been added.)

The reaction mixture was stirred at 45° C. for 1 hour after addition was complete and then further stirred at ambient temperature overnight. The resulting intermediate product, a polyimide/polyamic acid copolymer solution containing approximately 20 weight % solids, was collected and stored in a dry stoppered jar. The reaction mixture was one having medium viscosity. The polyimide/polyamic acid was chemically imidized using the procedure given below to afford a polyimide powder sample of the block copolyimide for further DSC analysis.

The chemical imidization procedure that was used is the following one. A 100 ml chemical imidization reaction vessel (flask+head) equipped with nitrogen purging (inlet/outlet) and mechanical stirrer was set up. (Normally 2–4 of these were run at once.) The block PI/PAA copolyimide sample from above (50.0 g) was charged to the reaction vessel. Two clean, dry graduated 10 ml pipettes (graduated to 0.02 ml) were used—one to measure volumetrically acetic anhydride and the other to measure volumetrically triethylamine. With moderate stirring of the copolyimide sample, the specified volume (infra) of acetic anhydride (AA) was added to the reaction mixture. The reaction mixture turned cloudy. Stirring was continued at ambient temperature until a clear, homogeneous reaction mixture was obtained. With continued stirring, the specified volume of triethylamine ($Et_3N$) was added to the reaction mixture. (Precipitation occurred shortly after the triethylamine has been added.) Stirring was continued for 6 hrs (or overnight) at ambient temperature with periodic breaking up of any clumps which formed in the reaction mixture during this period.

The reaction mixture was poured into methanol in a Waring blender with power applied to afford precipitation of the polyimide. The resulting precipitate was collected by vacuum filtration using a Buchner funnel with filter paper added. The resulting solid was dried over two consecutive nights. On the first night, the sample was dried in a vacuum drying oven at 100° C. On the second night, the final drying was done in a vacuum drying oven set at ~200–210® C. After final drying, any large clumps that were present were broken up to give a reasonably uniform powder. The resulting powder sample was used for analysis and characterization.

The chemical imidization reagent amounts used in Example 5 are given below.

| Example | VOL AA (ml) | VOL $Et_3N$ (ml) |
|---|---|---|
| 7 | 3.31 | 4.88 |

This polyimide sample exhibited in the first DSC scan a melting point of 374° C. and heat of fusion of 11.4 J/g. It did not exhibit a melting point during the second and third DSC scans and hence did not exhibit recoverable semicrystallinity.

Examples 6–13

The syntheses of the additional 8 capped block copolyimides listed below were done in a similar manner as given above for Example 5, except that the chemical imidization reagent amounts and the amounts of monomers used were adjusted as outlined below.

| Example | Capped Block Copolyimide | A Segment MW |
|---|---|---|
| 6 | ODPA/APB-133(50)//BPDA/APB-134(50) | 7.5K |
| 7 | ODPA/APB-133(50)//BPDA/APB-134(50) | 5K |
| 8 | ODPA/APB-133(60)//BPDA/APB-134(40) | 10K |
| 9 | ODPA/APB-133(40)//BPDA/APB-134(60) | 10K |
| 10 | ODPA/APB-133(30)//BPDA/APB-134(70) | 10K |
| 11 | ODPA/APB-133(20)//BPDA/APB-134(80) | 10K |
| 12 | ODPA/APB-133(20)//BPDA/APB-134(80) | 7.5K |
| 13 | ODPA/APB-133(20)//BPDA/APB-134(80) | 5K |

Chemical Imidization Reagent Amounts

| Example | VOL AA (ml) | VOL $Et_3N$ (ml) |
|---|---|---|
| 6 | 3.34 | 4.93 |
| 7 | 3.40 | 5.02 |
| 8 | 2.68 | 3.96 |
| 9 | 3.93 | 5.81 |
| 10 | 4.56 | 6.73 |
| 11 | 5.18 | 7.66 |
| 12 | 5.19 | 7.67 |
| 13 | 5.22 | 7.71 |

Monomer Amounts

| Example | |
|---|---|
| 6 | 8.2012 g of ODPA; 7.1663 g of APB-133; 7.2024 g of BPDA; 7.9404 g of APB-134; 0.2243 g of PA |
| 7 | 8.3442 g of ODPA; 7.0214 g of APB-133; 7.0654 g of BPDA; 8.0821 g of APB-134; 0.2200 g of PA |
| 8 | 9.7542 g of ODPA; 8.6853 g of APB-133; 5.7350 g of BPDA; 6.3808 g of APB-134; 0.1786 g of PA |
| 9 | 8.1282 g of ODPA; 7.2389 g of APB-133; 11.0092 g of BPDA; 11.6993 g of APB-134; 0.3425 g of PA |
| 10 | 8.1282 g of ODPA; 7.2384 g of APB-133; 17.2387 g of BPDA; 18.0819 g of APB-134; 0.5361 g of PA |
| 11 | 8.1290 g of ODPA; 7.2384 g of APB-133; 29.7002 g of BPDA; 30.8453 g of APB-134; 0.9249 g of PA |
| 12 | 8.2006 g of ODPA; 7.1660 g of APB-133; 29.6316 g of BPDA; 30.9160 g of APB-134; 0.9227 g of PA |
| 13 | 8.3456 g of ODPA; 7.0209 g of APB-133; 29.4949 g of BPDA; 31.0572 g of APB-134; 0.9185 g of PA |

*Experiments 11–13 were run in a 500 ml reaction vessel in place of a 250 ml vessel (which was used for all other experiments)

Example 14

Each of the powder polyimide samples from Examples 5-13 was subjected to DSC analysis to determine the melting point, glass transition, and crystallization characteristics of the sample in relation to its structural characteristics. An initial DSC analysis up to 500° C. was done to determine the appropriate upper temperature limit ($T_{ul}$) for the sample to be brought to during the multiple scan DSC analysis. This $T_{ul}$ was chosen to be below the temperature above which appreciable decomposition would occur, but above the temperature(s) of all significant transitions (melting, glass transition, etc.) In each case, the original sample was discarded and replaced with a fresh sample for the multiple scan DSC.

The multiple scan DSC was then run in the following manner:

1) An initial heat scan from ambient to $T_{ul}$ at 10° C./minute.
2) A slow cool scan from $T_{ul}$ to ambient at 10° C./minute.
3) A second heat scan from ambient temperature to $T_{ul}$ at 10° C./minute.
4) An uncontrolled quench cool scan from $T_{ul}$ to ambient temperature.
5) A third heat scan from ambient temperature to 500° C. at 10° C./minute.

All of the samples exhibited initial DSC melting point behavior during the first DSC scan (First Heat as designated below) indicating these copolyimides are semicrystalline. Only those block compositions having a 30:70 or 20:80 A to B block ratio were found to exhibit the desired recoverable semi-crystallinity, in which DSC melting behavior is seen in all three scans (First Heat, Second Heat, and Third Heat) and which is indicative of crystallizability of the sample from the melt.

Specific properties measured for these copolyimides are listed below.

| Copolyimide | $M_n$ | $M_w$ | First Heat MP, HOF | Second Heat MP, HOF | Third Heat MP, HOF |
|---|---|---|---|---|---|
| Ex. 5 | 78K | 137K | 374, 11.4 | None | None |
| Ex. 6 | 66.5K | 115K | 369, 11.5 | None | None |
| Ex. 7 | 66.9K | 105K | 363, 10.5 | None | None |
| Ex. 8 | 82.8K | 163K | 362, 10.8 | None | None |
| Ex. 9 | 56.8K | 120K | 378, 15.6 | Marginal | 375, 7.1 |
| Ex. 10 | 66.8K | 134K | 381, 15.5 | 379, 11.5 | 381, 13.0 |
| Ex. 11 | 66.1K | 135K | 382, 16.7 | 382, 16.1 | 382, 20.6 |
| Ex. 12 | 63.3K | 178K | 383, 24.5 | 378, 17.4 | 377, 18.9 |
| Ex. 13 | 61.5K | 153K | 381, 23.8 | 372, 15.6 | 370, 15.3 |

$M_n$ and $M_w$ values determined by GPC.

K indicates multiply by 1000.

MP is DSC melting point measured in ° C.

HOF is DSC heat of fusion measured in J/g.

Copolyimides from Examples 10–13 also exhibited crystallization peaks of substantial magnitude in the first cool scan and/or second heat scan. The peaks were observed in the range 286–318° C. and had heats of fusion in the range of 13–18.1 Joules/gram.

Example 15

Selected block and random copolyimide samples were characterized for melt viscosity using a capillary rheometer. Measurements were taken at 5 different shear rates of 100, 200, 500, 1000, and 2000 sec$^{-1}$. A duplicate determination was normally made for one shear rate, which was usually 1000 sec$^{-1}$. Results obtained for representative block and random copolyimides are given below.

| Copolyimide | Apparent Viscosity (Pa.S@500/sec shear rate (SR)) |
|---|---|
| ODPA/APB-133(20)//BPDA/APB-134(80) BLOCK* $M_w$ = ~60K | 100 |
| ODPA/APB-133(20)//BPDA/APB-134(80) BLOCK* $M_w$ = ~110–180K | 1245–1950 |
| ODPA(20)/BPDA(80)/APB-133(20)/APB-134(80) RANDOM, Comparative Example 5 $M_w$ = ~180K | 956 |
| ODPA(20)/BPDA(80)/APB-133(20)/APB-134(80) RANDOM** $M_w$ = ~90K | 113 |

*These block copolymides were prepared using the general procedure of Example 1 with monomer amounts adjusted to correspond to the indicated mole percentages for the two segments.
**This random copolyimide was prepared using the general procedure of Comparative Example 5 with monomer amounts adjusted to correspond to the indicated mole percentages for the two segments.

These melt viscosity determinations demonstrated the key result that ODPA/APB-133//BPDA/APB-134 block copolyimide with $M_w$=~60K, which exhibited an apparent viscosity of 100 Pa.S@ 500/sec shear rate, has sufficiently low melt viscosity to be melt-processable without any additives.

Comparative Example 5

The synthesis and characterization for DSC melting behavior and melt viscosity of ODPA(20)/BPDA(80)/APB-133(20)/APB-134(80) random copolyimide, having 6 mole % phthalic anhydride end-cap (97% of stoichiometric dianhydride), was done for comparison to the corresponding block copolyimide described above. The synthesis of this random tetrapolyimide was effected as given below.

All monomers were dried overnight at 40–50° C. for diamines and 160° C. for dianhydrides and then placed in bottles, which were tightly closed and taped and then stored in a dessicator. A dry 4-neck, 250 ml round-bottomed flask equipped with a mechanical stirrer, nitrogen inlet, Dean-Stark trap/condenser, and thermometer (reading to ~250° C.) was set-up and dried using a heat gun just prior to start of the reaction sequence. To the reaction flask was added NMP (100 ml), and light stirring was started. ODPA (8.2006 g) and BPDA (29.6316 g) were added as powders to the stirred reaction mixture to afford a slurry and 10 ml of NMP was used as rinse to quantitatively transfer the dianhydride powder samples to the reaction flask.

A solution of 7.1654 g of APB-133 and 30.9160 g of APB-134 in 170 ml of NMP was made and placed in an addition funnel ready to add. Phthalic anhydride (0.9227 g) and 10 ml NMP (as rinse) were added to the stirred reaction and then immediately afterwards step the following step was executed. The diamine solution from above was added to the stirred reaction mixture over 10–20 minutes. An additional 8 ml of NMP was added as rinse. (A total of 298 ml of NMP was added; the approximate reaction mixture volume was 374 ml.) The resulting polyamic acid mixture was stirred overnight at ambient temperature. GPC analysis of the polyamic acid mixture yielded the following molecular weight data: $M_n$=94.8K and $M_w$=180K.

A sample of the resulting intermediate polyimide/polyamic acid mixture was subjected to chemical imidization as described above using 6.35 ml of acetic anhydride and 9.39 ml of triethylamine to afford a solid powdered sample of this random copolyimide. This random copolyimide was found by DSC analysis to have a melting point of 326° C. and heat of fusion of 11.9 J/g in the first DSC scan. The melting point DSC curve was quite broad (in relation to that of comparable block copolyimides). No melting point behavior was observed in the second and third scans, indicating this random copolyimide does not exhibit recoverable semicrystallinity. It does possess initial semicrystallinity as evidenced by the melting point behavior in the first scan.

Comparative Example 6

Preparation of Polyimide Based on BPDA/APB-134/PA

98/100/4 8% of stoichiometric dianhydride) BPDA (14.414 g, 0.04899 mole) and DMAC (175 ml) were mixed together to form a slurry (solubility of BPDA is very low in DMAC). With stirring, PA (0.296 g) was added to the slurry and then APB-134 (14.617 g, 0.05 mole) was added to the stirred slurry. The resulting mixture was stirred overnight at ambient temperature to afford a BPDA/APB-134/PA polyamic acid solution, which was established to have the following characteristics; Inherent viscosity=$\eta_{inh}$=0.86 deciliter/gram (dl/g).

The above polyamic acid solution was chemically imidized to BPDA/APB-134 homopolyimide endcapped with PA using the procedure which follows. To the above polyamic acid solution were added with stirring TEA (0.72 ml) and AA (1.08 ml), and the resulting mixture was stirred at 30° C. for 18 hours with gellation being noted of the sample after about 1 hour at 30° C. The resulting polyimide was isolated in methanol in a Waring blender using a ratio of approximately 10 g of polymer solution to 500 ml of methanol. An additional Waring blender treatment with 500 ml of methanol was done after filtration before drying at 200° C. under nitrogen and vacuum to constant weight.

The resulting polyimide was characterized by DSC. The DSC testing was done with three heat scans from ambient temperature to at least 410° C. with a subsequent cooling scan between each heat scan. Glass transition temperature ($T_g$), crystallization temperature ($T_c$), and melting temperature ($T_m$) were determined for each scan. The crystallization temperature was taken to be the peak of the DSC output for the crystallization transition and the melting temperature was taken to be the peak of the DSC output for the melting transition. For this BPDA/RODA homopolyimide, the measured $T_m$ was 403° C. for the second heat and 404° C. for the first heat. The measured $T_g$s were 200° C. ($2^{nd}$ heat) and 218° C. ($3^{rd}$ heat) and the $T_c$ ($2^{nd}$ heat) was measured as 222° C. While this end-capped homopolyimide is semicrystalline and exhibits recoverable semicrystallinity (as evidenced by the melting point observations in the $2^{nd}$ and $3^{rd}$ heat scans), its melting point in excess of 400° C. is too high for it to be melt-processable. Hence this is a comparative example.

Examples 16–19

General

This example illustrates that selected other block copolyimides are semi-crystalline and exhibit melting points less than 390° C. with recoverable DSC melting point behavior. From an initial set of approximately 25 alternative capped block copolyimide compositions having different monomers and A:B block ratios that were synthesized and tested, the following 4 were found to be semicrystalline polyimides by DSC (differential scanning calorimetry) analysis and to exhibit the desirable recoverable DSC melting point behavior with a melting temperature within the desired range. The recoverable DSC melting point behavior is a significant indicator of the polymer sample being recrystallizable from the melt as is desired. Each of these block copolyimides was obtained as a solution of the polyimide/polyamic acid block copolymer using the synthetic methodology described in U.S. Pat. No. 5,202,412 and with end-capping usually to 97% stoichiometry with phthalic anhydride. The resulting PI/PAA solutions were subjected to chemical imidization, which after processing and drying afforded polyimide powder samples that were subjected to DSC analysis to obtain the thermal characteristics ($T_g$, $T_m$, and $T_c$, etc.) that are given below.

| BLOCK COPOLYIMIDE[a] | Example |
|---|---|
| BPDA/APB-133(20)//BPDA/APB-134(80) 7.5K | 18 |
| PMDA/APB-133(20)//BPDA/APB-134(80) 7.5K | 19 |
| 6FDA/APB-133(20)//BPDA/APB-134(80) 7.5K | 20 |
| 6FDA/APB-134(20)//BPDA/APB-134(80) 7.5K | 21 |

[a]The syntheses of the above 4 block copolyimides are given in Examples 16–19

Example 16

The synthesis of capped BPDA/APB-133(20)//BPDA/APB-134(80) block copolyimide with a flexible block ("A" block) molecular weight of 7500 g/mole (as PI) was run as described below. The sample was made to 97 mole % stoichiometry in dianhydride and was end-capped with 6 mole % phthalic anhydride. The following steps were executed to effect the synthesis.

All monomers were dried overnight at 40–50° C. for diamines and 160° C. for dianhydrides and then placed in bottles which were tightly closed and then stored in a dessicator. A dry 4-neck, 500 ml round-bottomed flask equipped with a mechanical stirrer, nitrogen inlet, Dean-Stark trap/condenser, and thermometer (reading to ~250° C.) was set-up and dried using a heat gun just prior to start of the reaction sequence. The equipment was adjusted such that the thermometer was immersed in the initial reaction volume of ~85 ml in the 500 ml flask. To the reaction flask were added 7.9896 g of BPDA and NMP (30 ml), and light stirring was started.

APB-133 (7.37711 g) was weighed into a container with lid, NMP (35 ml) was added, and the mixture was agitated until all of the APB-133 was in solution. Then the resulting diamine solution was added to the reaction flask with light stirring. NMP (5 ml) was used to rinse the container and the rinsings obtained were added to the flask. (Total ml of NMP added at end of the above steps was 70 ml; mixture was ~17.5% solids.) The resulting reaction mixture was stirred for 30 minutes.

The Dean-Stark trap was completely filled with Aromatic 150 liquid (from Exxon). Aluminum foil was wrapped around the Dean-Stark trap as thermal insulation. Aromatic 150 liquid (8 ml) was added to the reaction mixture in the pot and the resulting reaction mixture was heated to 180° C. over ~90 minutes. The reaction temperature was maintained at 180° C. for 3 hours, during which time there was a steady stream of condensate dripping from the condenser and water collected in the Dean-Stark trap. The nitrogen flow through the reactor was increased (approximately doubled), pertinent areas of the flask were heated with a heat gun for ~5 minutes to remove condensation lining the flask, and then the nitrogen flow rate was set back to normal initial rate. Heating was stopped until the reaction flask had cooled to 45° C. and then heat was applied at a lower setting to maintain the reaction mixture at 45° C. BPDA (29.6327 g) was added along with 110 ml of NMP (as a rinse) to the reaction mixture while it was being stirred gently and stirring was continued for 10 minutes. Phthalic anhydride (PA, 0.9227 g) was then added to the reaction mixture using 10 ml of NMP as a rinse. APB-134 (30.9154 g) was weighed into a stoppered vessel, NMP (100 ml) was added, and the resulting mixture was agitated until a solution resulted. The solution was kept stoppered until it was added. The APB-134 solution from above was added dropwise to the stirred reaction mixture over 5–10 minutes using an addition funnel. At the end of the addition, NMP (8 ml) was used for rinsing the stoppered vessel and the resulting rinse was added to the reaction mixture. (The approximate volume of the reaction mixture at this point was 374 ml; 298 ml total of NMP have been added.) The reaction mixture was stirred at 45° C. for 1 hour after addition was complete and then further stirred at ambient temperature overnight. The resulting intermediate product, a polyimide/polyamic acid copolymer solution containing approximately 20 weight % solids, was collected and stored in a dry stoppered jar. The polyimide/polyamic acid reaction mixture was one having medium viscosity. It was chemically imidized using the procedure given below to afford a polyimide powder sample of the block copolyimide for DSC analysis (to provide the properties as reported supra).

The chemical imidization procedure used is given below. A 100 ml chemical imidization reaction vessel (flask+head) equipped with nitrogen purging (inlet/outlet) and mechanical stirrer was set up. (Normally 2–4 of these were run at once.) The block PI/PAA copolyimide sample from above (50.0 g) was charged to the reaction vessel. Two clean, dry graduated 10 ml pipettes (graduated to 0.02 ml) were used—one to measure volumetrically acetic anhydride and the other to measure volumetrically triethylamine. With moderate stirring of the copolyimide sample, the specified volume (infra) of acetic anhydride (AA) was added to the reaction mixture. The reaction mixture turned cloudy. Stirring was continued at ambient temperature until a clear, homogeneous reaction mixture was obtained. With continued stirring, the specified volume of triethylamine ($Et_3N$) was added to the reaction mixture. (Precipitation occurred shortly after the triethylamine has been added) Stirring was continued for ~6 hours (or overnight) at ambient temperature with periodic breaking up of any clumps which formed in the reaction mixture during this period.

The reaction mixture was poured into methanol in a Waring blender with power applied to afford precipitation. The resulting precipitate was collected by vacuum filtration using a Buchner funnel with filter paper added. The resulting solid was dried over two consecutive nights. On the first night, the sample was dried in a vacuum drying oven at 100° C. On the second night, the final drying was done in a vacuum drying oven set at ~200–210° C. After final drying, any large clumps that were present were broken up to give a reasonably uniform powder. The resulting powder sample was used for analysis and characterization.

The chemical imidization reagent amounts used for Example 16 are given below.

| Example | VOL AA (mL) | VOL $Et_3N$ (ml) |
|---|---|---|
| 16 | 5.19 | 7.67 |

Examples 17–19

The synthesis of each of the other 3 members of the set of capped block copolyimides in this set of examples (supra) was run in a similar manner as given above for Example 16, except that the amounts of monomers used in the block PI/PAA syntheses and the chemical imidization reagent amounts were adjusted as outlined below.

| | Monomer Amounts |
|---|---|
| Example* | |
| 17 | 6.8049 g of PMDA, 8.5620 g of APB-133; 29.6347 g of BPDA; 30.9127 g of APB-134; 0.9228 g of PA |
| 18 | 9.6077 g of 6FDA; 5.7583 g of APB-133; 29.6278 g of BPDA; 30.9187 g of APB-134; 0.9226 g of PA |
| 19 | 9.6077 g of 6FDA; 5.7577 g of APB-134; 29.6284 g of BPDA; 30.9192 g of APB-134; 0.9226 g of PA |

| Chemical Imidization Reagent Amounts | | |
|---|---|---|
| Example | VOL AA (ml) | VOL $Et_3N$ (ml) |
| 17 | 5.19 | 7.67 |
| 18 | 5.20 | 7.67 |
| 19 | 5.20 | 7.67 |

Example 20

Each of the powder polyimide samples from Examples 16–19 was subjected to DSC analysis to determine the melting point, glass transition, and crystallization characteristics of the sample in relation to its structural characteristics. An initial DSC analysis was done to determine the appropriate upper temperature limit ($T_{ul}$) for the sample to be brought to during the multiple scan DSC analysis. This $T_{ul}$ was chosen to be below the temperature above which appreciable decomposition would occur, but above the temperature(s) of all significant transitions (melting, glass transition, etc.) In each case, the original sample was discarded and replaced with a fresh sample for the multiple scan DSC.

The multiple scan DSC was then run in the following manner:

1) An initial heat scan from ambient to $T_{ul}$ at 10° C./minute.
2) A slow cool scan from $T_{ul}$ to ambient at 10° C./minute.
3) A second heat scan from ambient temperature to $T_{ul}$ at 10° C./minute.
4) A quench cool scan from $T_{ul}$ to ambient temperature.
5) A third heat scan from ambient temperature to 500° C. at 10° C./minute.

Results of the DSC study of this set of block copolyimides are summarized below. Only a few of the many block compositions tested (approximately 25) were found to be semicrystalline by DSC analysis and even fewer to also exhibit the desired recoverable DSC melting point behavior. Furthermore, these block copolyimides were found to exhibit fast crystallization kinetics, which is a significant potential advantage. These block copolyimides have somewhat higher glass transition temperatures ($T_g$s) than do the ODPA/APB-133//BPDA/APB-134 block copolyimide samples described in earlier examples or the random copolyimides described in the comparative examples.

Specific properties measured for these copolyimides are listed below.

| Copolyimide | $M_n$ | $M_w$ | First Heat MP, HOF | Second Heat MP, HOF | Third Heat MP, HOF |
|---|---|---|---|---|---|
| Ex. 16 | 61K | 138K | 387, 27.9 | 380, 19.9 | 372, 18.9 |
| Ex. 17 | (Not Available) | | 386, 19.8 | 379, 18.1 | 375, 18.9 |
| Ex. 18 | 21K | 51.2K | 386, 25.3 | 382, 17.4 | 378, 19.7 |
| Ex. 19 | 48K | 133K | 386, 31.7 | 383, 19.2 | 379, 20.6 |

$M_n$ and $M_w$ values determined by GPC.
K indicates multiply by 1000.
MP is DSC melting point measured in ° C.
HOF is DSC heat of fusion measured in J/g.

Each of the above capped block copolyimide samples was found to exhibit recoverable DSC melting behavior which is most pronounced (as measured by the heat of fusion/gram of polymer) at approximately 380° C. This behavior indicates that each of these copolyimides is semicrystalline as obtained initially from solution and furthermore that it crystallizes from the melt as is desired for a melt-processible PI. (In contrast to these block copolyimides containing BPDA/APB-134 as the "B" block, the corresponding homopolyimide of BPDA/APB-134 has a melting point of over 400° C.—see Comparative Example 6).

Comparative Example 7

The synthesis and characterization for DSC melting behavior and melt viscosity of BPDA/APB-133(20)/APB-134(80) random copolyimide, having 6 mole % phthalic anhydride end-cap, was done for comparison to the corresponding block copolyimide described above. The synthesis of this random tetrapolyimide was effected as outlined below:

All monomers were dried overnight at 40–50° C. for diamines and 160° C. for dianhydrides and then placed in bottles which were tightly closed and taped and then stored in a dessicator. A dry 4-neck, 250 ml round-bottomed flask equipped with a mechanical stirrer, nitrogen inlet, Dean-Stark trap/condenser, and thermometer (reading to ~250° C.) was set-up and dried using a heat gun just prior to start of the reaction sequence. To the reaction flask was added NMP (60 ml), and light stirring was started. BPDA (18.8119 g) was added as a powder to the stirred reaction mixture to afford a slurry and 10 ml of NMP was used as rinse to quantitatively transfer the dianhydride powder to the reaction flask. A solution of 3.6878 g of APB-133 and 15.4582 g of APB-134 in 60 ml of NMP was made and placed in an addition funnel ready to add. Phthalic anhydride (0.4614 g) and 4 ml NMP (as rinse) were added to the stirred reaction and then immediately afterwards the following step was executed. The diamine solution was added to the stirred reaction mixture over 10–20 minutes. An additional 5 ml of NMP was added as rinse. (A total of 149 ml of NMP was added; the approximate reaction mixture volume was 187 ml.)

The resulting polyamic acid mixture was stirred overnight at ambient temperature. GPC analysis of the polyamic acid mixture afforded the following molecular weight data: $M_n$=49.2K and $M_w$=142K.

A sample of the resulting intermediate polyimide/polyamic acid solution was subjected to chemical imidization as described above using 5.19 ml of acetic anhydride and 7.67 ml of triethylamine to afford a solid powdered sample of this random copolyimide. This random copolyimide exhibited a melting point of 352° C. and heat of fusion of 21.1 J/g in the first DSC heat scan. In the second DSC heat scan, the melting point was 348° C. but the heat of fusion dropped drastically to 3.0 J/g. No melting point behavior was observed in the third heat scan. This copolyimide was thus characterized to be semi-crystalline (as evidenced by melting behavior in the initial scan and some in the second scan) but to not exhibit significant recoverable semicrystallinity.

Examples 22–27

These examples illustrate block copolyimides having recoverable crystallinity that were synthesized using an alternative technique for achieving sequenced polymerization as described below. Six block copolyimides were prepared using the dianhydride and diamine components comprising ODPA, BPDA, APB-133, and APB-134. Phthalic anhydride end-capping was not used.

A technique of sequenced polymerization was used, which consisted of first making a series of soluble oligomeric polyimides of ODPA/APB-133 by thermal imidization of the corresponding polyamic-acids. Each one of these materials, which was excess in amino functionality, was separately mixed with a fixed amount of polyamic-acid based on BPDA/APB-134 and containing 98% of the stoichiometric amount of BPDA. The copolymers were then formed by addition of the necessary amounts of BPDA to consume all excess amino groups. The resulting copolymers consisted of imidized chain segments of ODPA/APB-133 linked to unconverted, amic-acid chain segments of BPDA/APB-134.

The above partially imidized block copolymers were converted completely to fully imidized block copolyimides using acetic anhydride and triethylamine, and each copolyimide was isolated as powdered polyimide resin with excess acetone in a blender. Products were dried to constant weight under nitrogen and vacuum at 200° C. before further characterizations and demonstrations of utility. Additional details are given below.

Preparation of ODPA/APB-133—Part A

To solutions of APB-133, the following amounts of ODPA were added with stirring in a nitrogen filled glove box. The reaction mixture was stirred for three hours and then water of imidization was collected in a Dean-Stark trap, after first adding 40 ml of reagent grade xylenes, and stirring under reflux. The resulting oligomeric imide was soluble after stripping off the xylene.

| | | Amounts (g or ml) | | |
|---|---|---|---|---|
| Example | Amine % Excess | APP-133 (g) | ODPA (g) | NMP (ml) |
| 22 | 50 | 5.847 | 3.102 | 53.4 |
| 23 | 40 | 5.847 | 3.723 | 57.1 |

-continued

| Example | Amine % Excess | APP-133 (g) | ODPA (g) | NMP (ml) |
|---|---|---|---|---|
| 24 | 30 | 5.847 | 4.343 | 60.8 |
| 25 | 20 | 5.847 | 4.964 | 64.5 |
| 26 | 10 | 5.847 | 5.584 | 68.2 |
| 27 | 2 | 5.847 | 6.080 | 71.1 |

Preparation of BPDA/APB-134—Part B

For each oligomeric imide preparation (Part A), the following polyamic-acid was made. An amount (23.287 grams) of APB-134 was dissolved in 277 ml of dry NMP in a nitrogen filled glove box. To this solution, 23.066 grams of BPDA was added with stirring over 20 minutes. The mixture was stirred overnight, whereupon a clear polyamic-acid resulted.

Preparation of Block Copolyamic-acid/imdes—Part C

Each of the polyimide oligomer samples of Part A was combined with one of the polyamic-acid samples of Part B. The required amount of BPDA was added along with NMP as showm below, and the resulting reaction mixture was stirred for four hours to afford the set of 6 copolyamic-acid/imides (Samples from Examples 22–27).

| Example | Additional BPDA | Amount of NMP |
|---|---|---|
| 22 | 3.5984 | 20.9 |
| 23 | 2.9780 | 17.2 |
| 24 | 2.3576 | 13.5 |
| 25 | 1.7372 | 9.8 |
| 26 | 1.1168 | 6.1 |
| 27 | 0.6204 | 3.1 |

Preparation of Fully Imidized Block Copolyimides—Part D

Each of the copolyamic-acid/imides of Part C was chemically converted to filly imidized block (sequenced) copolyimide by mixing 100 grams of each with 13 ml of triethylamine and 9 ml of acetic anhydride and then allowing the reaction mixture to stand under nitrogen for 24 hours. The product was precipitated in acetone in a blender. After filtering, it was washed twice with acetone in a blender with intermediate filterings. In each case, the resin was dried to constant weight in a vacuum oven under nitrogen at 200° C.

Each sample was analyzed by DSC. The DSC analyses were carried out using a Mettler TA 3000 system and large aluminum pans. Polymers were kept dry under nitrogen and were weighed out just prior to analysis. Sample weights ranged from 35 to 50 mg, preferably 40 mg, and they were weighed to the nearest tenth of a milligram. After capping the samples with the Mettler equipment, and punching a small hole in the cap of the pan, the DSC analysis was done at the rate of 10° C./min, up to 400° C. The pan and contents were immediately quench/cooled in dry ice. The sample was then heated at the same rate under nitrogen to 400° C. and quenched again. If a third pass was desired, the same heating rate and maximum temperature were applied.

TABLE 1

UNCAPPED SEQUENCED COPOLYIMIDES OF ODPA/APB-133//BPDA/APB-134*

| Example | ~DP ODPA/APB-133 | DSC PASS | Tg °C. | Tc °C. | Tc J/G | Tg °C. | Tg J/G | Tg °C. | Tc °C. | Tc J/G | Tm °C. | Tm J/G |
|---|---|---|---|---|---|---|---|---|---|---|---|---|
| 22 | 2 | 2 | 221 | 266 | 10.8 | 373 | 15.0 | 224 | 283 | 6.9 | 367 | 11.7 |
|    | 2 | 3 | 216 | 270 | 4.9  | 364 | 14.8 | 224 | —   | —   | —   | —    |
| 23 | 3 | 2 | 219 | 262 | 9.6  | 375 | 13.5 | 218 | 262 | 9.1 | 374 | 17.3 |
|    | 3 | 3 | 216 | 256 | 4.7  | 367 | 9.9  | 216 | 265 | 2.4 | 362 | 13.7 |
| 24 | >3 | 2 | 220 | 263 | 9.0 | 372 | 14.3 | 218 | 262 | 9.1 | 375 | 17.3 |
|    | >3 | 3 | 215 | 264 | 4.4 | 361 | 13.8 | 217 | 271 | 5.4 | 357 | 10.6 |
| 25 | 5 | 2 | 218 | 268 | 8.0 | 366 | 9.0  | 217 | 259 | 8.5 | 375 | 17.6 |
|    | 5 | 3 | 222 | —   | —   | —   | —    | 215 | 257 | 4.6 | 364 | 14.3 |
| 26 | 10 | 2 | 218 | 264 | 6.7 | 369 | 7.0 | 213 | 254 | 7.5 | 381 | 17.6 |
|    | 10 | 3 | 222 | —   | —   | —   | —    | 213 | 251 | 2.8 | 376 | 13.4 |
| 27 | 20 | 2 | 208 | 242 | 3.7 | 395 | 14.1 | 206 | 237 | 3.3 | 393 | 20.6 |
|    | 20 | 3 | 220 | —   | —   | 384 | 12.8 | 191 | —   | —   | 382 | 14.4 |

*Ratio of APB-133/APB-134 = 20/80 in all polymers
Ratios of ODPA/BPDA in Example 22 = 10/90, in Example 23 = 12/88, in Example 24 = 14/86, in Example 25 = 16/84, in Example 26 = 18/82, in Example 27 = 20/80
~DP = approximate degree of polymerization As the results clearly indicate, there is unique retention of recoverable crystallinity in these block (sequenced) copolyimides.

What is claimed is:

1. A segmented, melt-processable, semicrystalline polyimide copolymer comprising a first imidized segment and a second imidized segment prepared by the steps of:
   a) preparing a first amic acid segment, the first amic acid segment being a precursor of the first imidized segment and being the reaction product of reacting a first acid dianhydride with a first diamine in a molecular ratio to obtain the first amic acid segment having two identical terminal portions selected from the group consisting of acid anhydride and amine,
   whereby combinations of the first acid dianhydride and the first diamine for forming the first amic acid segment respectively are selected from the group consisting of 4,4'-oxydiphthalic anhydride (ODPA) and 1,3-bis(3-aminophenoxy)benzene (APB-133) in combination; (3,3',4,4'-biphenyltetracarboxylic dianhydride (BPDA) and 1,3-bis(3-aminophenoxy) benzene (APB-133) in combination; pyromellitic dianhydride (PMDA) and 1,3-bis(3-aminophenoxy)benzene (APB-1 33) in combination; (2,2'-bis-(3,4-dicarboxyphenyl)hexafluoropropane dianhydride (6FDA) and 1,3-bis(3-aminophenoxy)benzene (APB-133) in combination; 3,3',4,4'-diphenylsulfone tetracarboxylic dianhydride (DSDA) and 1,3-bis(3-aminophenoxy)benzene (APB-133) in combination; and (2,2'-bis-(3,4-dicarboxyphenyl) hexafluoropropane dianhydride (6FDA) and 1,3-bis (4-aminophenoxy)benzene (APB-134) in combination;

b) imidizing the first amic acid segment to form the first imidized segment;

c) reacting the first imidized segment with reactant(s) selected from the group consisting of 1) a second acid dianhydride and a second diamine and 2) the second amic acid segment and a linking monomer selected from the group consisting of the second acid dianhydride and the second diamine;

whereby the first imidized segment reacts with reactant (s) to form a segmented polyimide/polyamic acid copolymer comprising the first imidized segment and the second amic acid segment, with the proviso that the choice in selection of the linking monomer between diamine and dianhydride in 2) is made by choosing that linking monomer needed to result in the polyimide/polyamic acid copolymer having overall stoichiometry of about 100%, whereby the second amic acid segment is attached to the first imidized segment through an amide group having a carbon-nitrogen bond, whereby combinations of the second acid dianhydride and the second diamine for forming the second amic acid segment respectively are selected from the group consisting of 3,3',4,4'-biphenyltetracarboxylic dianhydride (BPDA) and 1,3-bis(4-aminophenoxy) benzene (APB-134) in combination; and 3,3',4,4'-benzophenone tetracarboxylic dianhydride (BTDA) and 1,3-bis(4-aminophenoxy)benzene (APB-134) in combination; and d) imidizing the second amic acid segment to form the second imidized segment and thus resulting in formation of the segmented, melt-processable, semicrystalline polyimide copolymer, whereby the segmented, melt-processable, semicrystalline polyimide copolymer exhibits a melting point in the range of 330° C. to 395° C.

2. The segmented, melt-processable, semicrystalline polyimide copolymer of claim 1 wherein the reactant(s) are 1) the second acid dianhydride and the second diamine.

3. The segmented, melt-processable, semicrystalline polyimide copolymer of claim 1 wherein a semi-crystalline segment is present in the copolymer at a level of greater than or equal to 60 weight percent and the segment is selected from the group consisting of the first imidized segment and the second imidized segment.

4. The segmented, melt-processable, semicrystalline polyimide copolymer of claim 3 wherein the semi-crystalline segment is present in the copolymer at a level in the range of 65 to 85 weight percent.

5. The segmented, melt-processable, semicrystalline polyimide copolymer of claim 4 wherein the semi-crystalline segment is present in the copolymer at a level in the range of 75 to 85 weight percent.

6. The segmented, melt-processable, semicrystalline polyimide copolymer of claim 3 wherein the second acid anhydride is 3,3',4,4'-biphenyl-tetracarboxylic dianhydride (BPDA), the second diamine is 1,3-bis(4-aminophenoxy) benzene (APB-134), and whereby combinations of the first acid dianhydride and the first diamine for forming the first imidized segment respectively are selected from the group consisting of 4,4'-oxydipthalic anhydride (ODPA) and 1,3-bis(3-aminophenoxy)benzene (APB-133) in combination; 3,3',4,4'-biphenyltetracarboxylic dianhydride (BPDA) and 1,3-bis(3-aminophenoxy)benzene (APB-133) in combination; pyromellitic dianhydride (PMDA) and 1,3-bis(3-aminophenoxy)benzene (APB-133) in combination; 2,2'-bis-(3,4-dicarboxyphenyl)hexafluoropropane dianhydride (6FDA) and 1,3-bis(3-aminophenoxy)benzene (APB-133) in combination; 3,3',4,4'-diphenylsulfone tetracarboxylic dianhydride (DSDA) and 1,3-bis(3-aminophenoxy)benzene (APB-133) in combination; and 2,2'-bis-(3,4-dicarboxyphenyl)hexafluoropropane dianhydride (6FDA) and 1,3-bis(4-aminophenoxy)benzene (APB-134) in combination.

7. The segmented, melt-processable, semicrystalline polyimide copolymer of claim 3 wherein the first acid anhydride is 4,4'-oxydiphthalic anhydride (ODPA), the first diamine is 1,3-bis(3-aminophenoxy)benzene (APB-133), and whereby combinations of the second acid dianhydride and the second diamine for forming the second imidized segment are respectively selected from the group consisting of 3,3',4,4'-biphenyltetracarboxylic dianhydride (BPDA) and 1,3-bis(4-aminophenoxy)benzene (APB-134) in combination; and 3,3',4,4'-benzophenone tetracarboxylic dianhydride (BTDA) and 1,3-bis(4-aminophenoxy)benzene (APB-134) in combination.

8. The segmented, melt-processable, semicrystalline polyimide copolymer of claim 1 wherein the copolymer has a stoichiometry in the range from 93% to 98% and exhibits recoverable semicrystallinity as determined by differential scanning calorimetry analysis.

9. The segmented, melt-processable, semicrystalline polyimide copolymer of claim 1 wherein the first imidized segment is calculated based on stoichiometric imbalance to have a number average molecular weight in the range of 2,000 to 20,000.

* * * * *

UNITED STATES PATENT AND TRADEMARK OFFICE
CERTIFICATE OF CORRECTION

PATENT NO.    : 6,444,783 B1
DATED         : September 3, 2002
INVENTOR(S)   : John R. Dodd, John A. Kreuz and Brian C. Auman It is certified that error appears in the above-identified patent and that said Letters Patent is hereby corrected as shown below:

Column 29,
Line 8, delete "(APB-1 33) and insert -- (APB-13) -- therefor.

Column 30,
Lines 14 and 37, delete "claim 3" and insert -- claim 1 -- therefor.

Signed and Sealed this

Third Day of December, 2002

JAMES E. ROGAN
*Director of the United States Patent and Trademark Office*